United States Patent
Gogoi et al.

(10) Patent No.: US 10,409,942 B1
(45) Date of Patent: Sep. 10, 2019

(54) ELECTRONIC DESIGN MAPPING PROCESS

(71) Applicant: Cadence Design Systems, Inc., San Jose, CA (US)

(72) Inventors: Yuvaraj Gogoi, Karnataka (IN); Andrea Barletta, Cavenago di Brianza (IT)

(73) Assignee: Cadence Design Systems, Inc., San Jose, CA (US)

( * ) Notice: Subject to any disclaimer, the term of this patent is extended or adjusted under 35 U.S.C. 154(b) by 63 days.

(21) Appl. No.: 15/801,690

(22) Filed: Nov. 2, 2017

(51) Int. Cl.
*G06F 17/50* (2006.01)

(52) U.S. Cl.
CPC ...... *G06F 17/5068* (2013.01); *G06F 2217/02* (2013.01)

(58) Field of Classification Search
USPC ........................................................ 716/102
See application file for complete search history.

(56) References Cited

U.S. PATENT DOCUMENTS

| | | | | |
|---|---|---|---|---|
| 2002/0157080 A1* | 10/2002 | Kato | .................. | G06F 17/5045 716/104 |
| 2002/0162086 A1* | 10/2002 | Morgan | .............. | G06F 17/5045 716/102 |
| 2004/0111249 A1* | 6/2004 | Narahara | ............ | G06F 17/5022 703/22 |
| 2004/0117744 A1* | 6/2004 | Nation | ................ | G06F 17/5045 716/104 |
| 2007/0174805 A1* | 7/2007 | Hsu | ..................... | G06F 17/5022 438/17 |

* cited by examiner

*Primary Examiner* — Mohammed Alam

(74) *Attorney, Agent, or Firm* — Mark H. Whittenberger, Esq.; Holland & Knight LLP

(57) ABSTRACT

The present disclosure relates to a system and method for mapping an RTL vector file to an electronic design. Embodiments may include receiving, at one or more computing devices, an electronic design at an electronic design automation application and reading at least one gate-level netlist associated with the electronic design. Embodiments may also include preparing each gate object with different transformations so to match a register-transfer-level name and reading at least one vector object from one or more register-transfer-level vector files. Embodiments may further include attempting to identify at least one match in the gate-level netlist, wherein the at least one match is a match between a register-transfer-level name and a gate name. Embodiments may also include writing a validation file including at least one of mapped information and unmapped information.

20 Claims, 4 Drawing Sheets

200

202 — receiving, at one or more computing devices, an electronic design at an electronic design automation application 204 — reading at least one gate-level netlist associated with the electronic design 206 — preparing each gate object with different transformations so to match a register-transfer-level name 208 — reading at least one vector object from one or more register-transfer-level vector files 210 — attempting to identify at least one match in the gate-level netlist, wherein the at least one match is a match between a register-transfer-level name and a gate name 212 — writing a validation file including at least one of mapped information and unmapped information, wherein the mapped information is based upon, at least in part, the at least one match

ELECTRONIC DESIGN MAPPING PROCESS

FIELD OF THE INVENTION

The present disclosure relates to electronic design automation (EDA), and more specifically, to a method for mapping between an RTL vector file and an electronic design.

DISCUSSION OF THE RELATED ART

EDA utilizes software tools that may be used in the design and analysis of numerous electronic systems such as printed circuit boards (PCBs) and integrated circuits (ICs). Some EDA tools include mapping of register-transfer-level vector names to gate-level netlist names. However, previous systems have strictly required the use of a mapping file that is specified externally. This mapping file must be generated from tools that often require many days to generate and utilize several machines. Moreover, these files often also require manual modification in order to improve their coverage.

SUMMARY OF INVENTION

In one or more embodiments of the present disclosure, a computer-implemented method for mapping an RTL vector file to an electronic design is provided. The method may include receiving, at one or more computing devices, an electronic design at an electronic design automation application and reading at least one gate-level netlist associated with the electronic design. The method may further include preparing each gate object with different transformations so to match a register-transfer-level name and reading at least one vector object from one or more register-transfer-level vector files. The method may also include attempting to identify at least one match in the gate-level netlist, wherein the at least one match is a match between a register-transfer-level name and a gate name. The method may further include writing a validation file including at least one of mapped information and unmapped information, wherein the mapped information may be based upon, at least in part, the at least one match and the unmapped information includes unmatched information.

One or more of the following features may be included. In some embodiments, the method may include performing register-transfer-level power analysis. In some embodiments, attempting to identify a match may include a name transformation. If a match is not identified, the method may include removing one or more hierarchical separators (/) from RTL names. If a match is not identified, the method may include combining one or more name transformations. In some embodiments, combining one or more name transformations may include applying one or more rules. In some embodiments, combining one or more name transformations may include applying one or more custom rules.

In one or more embodiments of the present disclosure, a system for mapping an RTL vector file to an electronic design is provided. The system may include at least one processor configured to receive an electronic design. The at least one processor may be further configured to read at least one gate-level netlist associated with the electronic design. The at least one processor may be further configured to prepare each gate object with different transformations so to match a register-transfer-level name. The at least one processor may be further configured to read at least one vector object from one or more register-transfer-level vector files, wherein each vector object has a corresponding object in the gate-level netlist. The at least one processor may be further configured to attempt to identify at least one match in the gate-level netlist, wherein the at least one match is a match between a register-transfer-level name and a gate name. The at least one processor may be further configured to write a validation file.

One or more of the following features may be included. In some embodiments, attempting to identify a match may include a name transformation based upon, at least in part, one or more rules or one or more equivalency checks. The name transformation may include a transformation between the register-transfer-level name and the gate-level name. If a match is not identified, the at least one processor may be configured to remove one or more hierarchical separators (/) from RTL names and analyzing all possible combinations. If a match is not identified, the at least one processor may be configured to combine one or more name transformations. None of the processors access a mapping file. None of the processors access an RTL netlist to access the mapping file.

In one or more embodiments of the present disclosure, a computer readable storage medium having stored thereon instructions, which when executed by a processor, result in one or more operations is provided. Operations may include receiving, at one or more computing devices, an electronic design at an electronic design automation application and reading at least one gate-level netlist associated with the electronic design. Operations may also include preparing each gate object with different transformations so to match a register-transfer-level name and reading at least one vector object from one or more register-transfer-level vector files. Operations may further include attempting to identify at least one match in the gate-level netlist, wherein the at least one match is a match between a register-transfer-level name and a gate name.

One or more of the following features may be included. In some embodiments, operations may include performing register-transfer-level power analysis. In some embodiments, attempting to identify a match may include a name transformation. If a match is not identified, operations may include removing one or more hierarchical separators (/) from RTL names. If a match is not identified, operations may also include combining one or more name transformations. Operations may further include applying one or more custom rules.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 2 is a flowchart depicting operations consistent with the mapping process of the present disclosure;

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
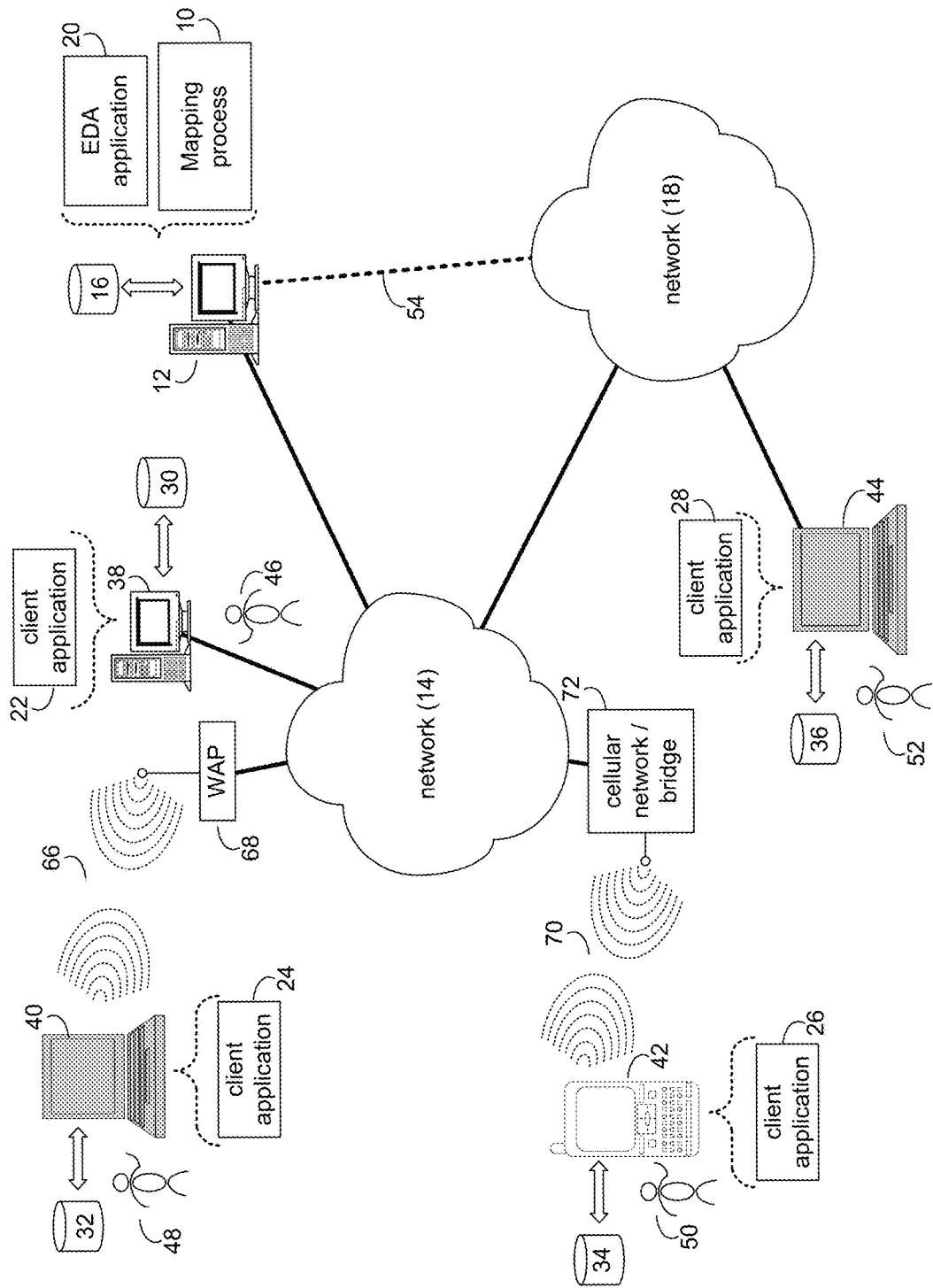
FIG. 1 is a system diagram depicting aspects of the mapping process in accordance with an embodiment of the present disclosure.

Referring to FIG. 1, there is shown mapping process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the mapping process may reside on and be executed, in whole or in part, by a client electronic device, such as a personal computer, notebook computer, personal digital assistant, or the like.

The instruction sets and subroutines of mapping process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

Mapping process 10 may be a stand-alone application, or may be an applet/application/script that may interact with and/or be executed within EDA application 20. In addition/as an alternative to being a server-side process, the mapping process may be a client-side process (not shown) that may reside on a client electronic device (described below) and may interact with an EDA client application (e.g., one or more of EDA client applications 22, 24, 26, 28). Further, the mapping process may be a hybrid server-side/client-side process that may interact with EDA application 20 and an EDA client application (e.g., one or more of client applications 22, 24, 26, 28). As such, the mapping process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize mapping process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Embodiments of mapping process 10 shown in FIGS. 1-4 may provide for mapping in an RTL vector file onto an electronic design. The process may include receiving (202), at one or more computing devices, an electronic design at an electronic design automation application and reading (204) at least one gate-level netlist associated with the electronic design. Embodiments may also include preparing (206) each gate object with different transformations so to match a register-transfer-level name and reading (208) at least one vector object from one or more register-transfer-level vector files. Embodiments may further include attempting (210) to identify at least one match in the gate-level netlist, wherein the at least one match is a match between a register-transfer-level name and a gate name. Embodiments may also include writing (212) a validation file including at least one of mapped information and unmapped information, wherein the mapped information may be based upon, at least in part, the at least one match and the unmapped information includes unmatched information.

Embodiments of mapping process 10 may be configured to automatically map register-transfer-level ("RTL") elements provided to an electronic design by using one or more vector files to map to gate level names. In some cases, RTL names may be similar to gate level names, but they may differ a lot. This situation may prevent the EDA application of prior approaches to match these objects unless names are exactly the same. In contrast to prior solutions, embodiments of mapping process 10 does not require an RTL netlist nor a logic equivalence checking ("LEC") mapping file nor any other kind of mapping file.

Embodiments of mapping process 10 may be configured to enhance a vector-based flow that may be available in EDA application 20, such as the applications available from the Assignee of the present disclosure. Accordingly, mapping process 10 may be configured to map the RTL token to a corresponding name in a gate domain, which may be necessary for activity annotation in this flow.

In existing solutions any vector-based analysis uses one or more mapping files to map names between RTL and gate level domains. Embodiments of mapping process 10 may remove the dependency of generating and using a mapping file. Moreover, using the teachings of the present disclosure no RTL netlist is required to replace information from the missing mapping file.

As used herein the phrase "electrical power analysis" may refer to the method to measure rate at which electrical energy is consumed per unit time in an electrical circuit. The phrase "value change dump" or "VCD" is an ASCII-based format for dumpfiles generated by EDA logic simulation tools. It may represent signal transitions during a certain time window. The phrase "vector-based power analysis" may refer to an analysis that uses Verilog value change dump (VCD), or other vector file formats, from a simulation to know the activity of an instance at a given time. This activity may be used to calculate the current flowing across the instance and compute consumed power. The phrase "synchronous sequential elements" may refer to instances in an electronic design whose state changes at discrete times in response to a clock signal. Flops are often the primary synchronous sequential elements in a circuit. "RTL" may refer to design abstraction or a high level representation of a circuit, a behavioral model, while "Gate" names may refer to lower-level names of a circuit, its structure represented by logic gate cells. As used herein, there may be multiple types of VCDs. For example, in RTL VCD, design abstraction is at the RTL level. Accordingly, signals may be on primary ports and sequential elements that are invariant points, meaning that will be for sure present in gate domain. Alternatively, in gate-level VCD, all of the value change dumps are for gate-level names, meaning that transitions are present for combinational logic as well.

Power analysis of a gate level circuit is traditionally dependent on VCD, or other vector file formats, generated by a simulation tool at various past stages of the design (e.g., vector-based analysis). Here, logic states of all instances are predetermined based on simulation stimulus. For Gate VCD, the simulation can be directly used for power calculation. However, for RTL VCD, a mapping file is initially required to map the corresponding names to a gate-level netlist. Alternatively, a designer may need a full RTL netlist to regenerate the mapping file. As such, this approach involves extra overhead to generate a correct mapping file with front end tools during back end or signoff phase. Accordingly, embodiments of mapping process 10 may provide an efficient and fast process where the translation of RTL names to gate-level names occurs automatically and without making use of an RTL netlist.

Existing systems use a vector-based power analysis mapping method, which requires a map activity file. As such, the mapping of RTL names to netlist names strictly requires a mapping file specified externally. This mapping file has to be generated from tools which requires many days on several core machines. These mapping files may also need to be hand modified to improve their coverage. If a mapping file is not available a designer will need the RTL netlist to regenerate it, by using an additional and dedicated EDA application.

Figure 3:
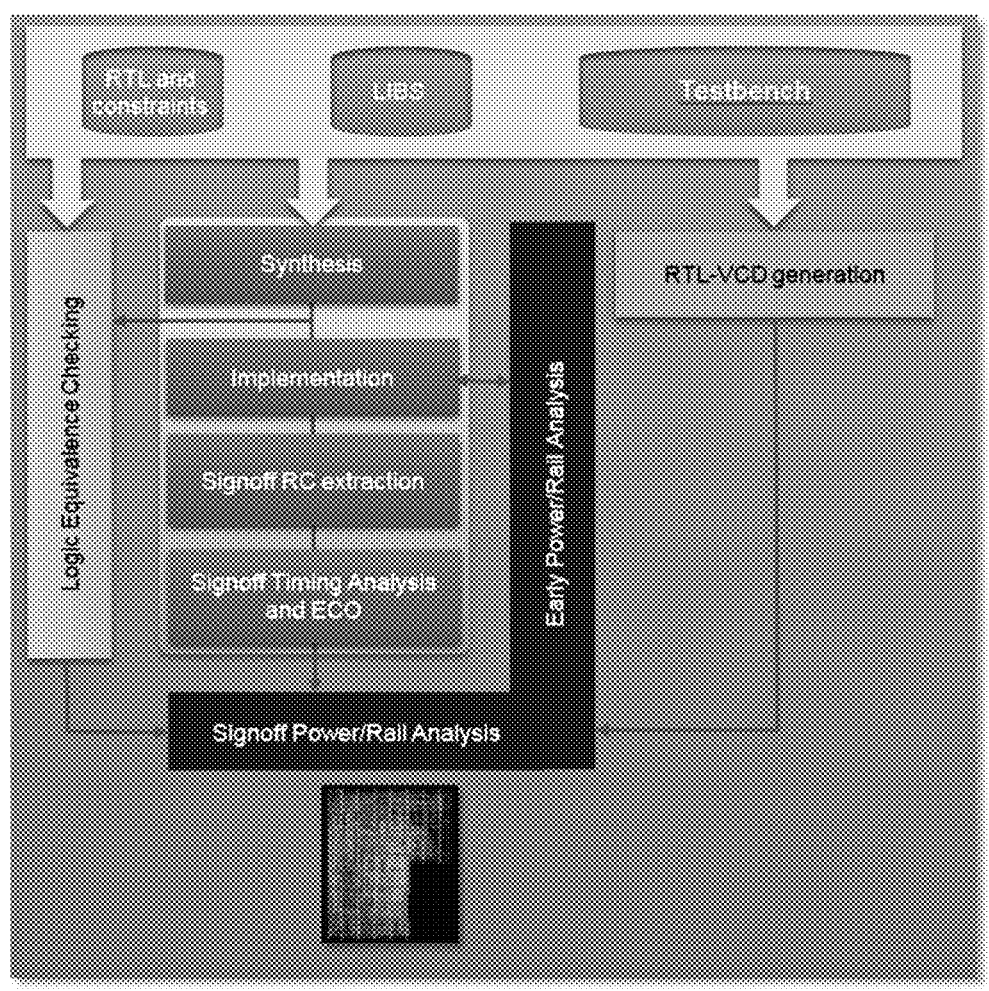
FIG. 3 is a schematic depicting aspects of the mapping process in accordance with an embodiment of the present disclosure.

Referring now to FIG. 3, an example of a prior approach with a mapping file is provided. As shown in the Figure, this example requires the generation of a mapping file after synthesis. If not available, the designer may need to run a Logic Equivalence Checking step using the RTL netlist data to generate it. If the designer has only physical design data and the RTL vector they may not be able to run early or signoff power integrity analysis. Any RTL-vector without a mapping file to a gate level netlist is useless. As such, coverage is essentially zero or too low so no meaningful power data can be calculated.

In some embodiments, mapping process 10 may involve some level of rule translation. It should be noted that all mapping from RTL to gate names involves some rule translation. These rules generally are either default rules or custom rules. Default rules may be generic to all designs. Typically, these are enough to reach total or high coverage. Custom rules are rules specific to some particular designs. They may need to be defined as simple patterns and may be included as part of mapping process 10 together with default rules. Accordingly, the automatic mapping associated with mapping process 10 may involve the processing of these rules and mapping of them in a dynamic technique. Most of designs have only default rules, so any automatic mapping will be successful. However, for designs with custom mapping rules, mapping process 10 may specify explicitly all these rules through a command option. Once they are specified, these rules may be processed by an automatic rule algorithm to finish the mapping.

Figure 4:
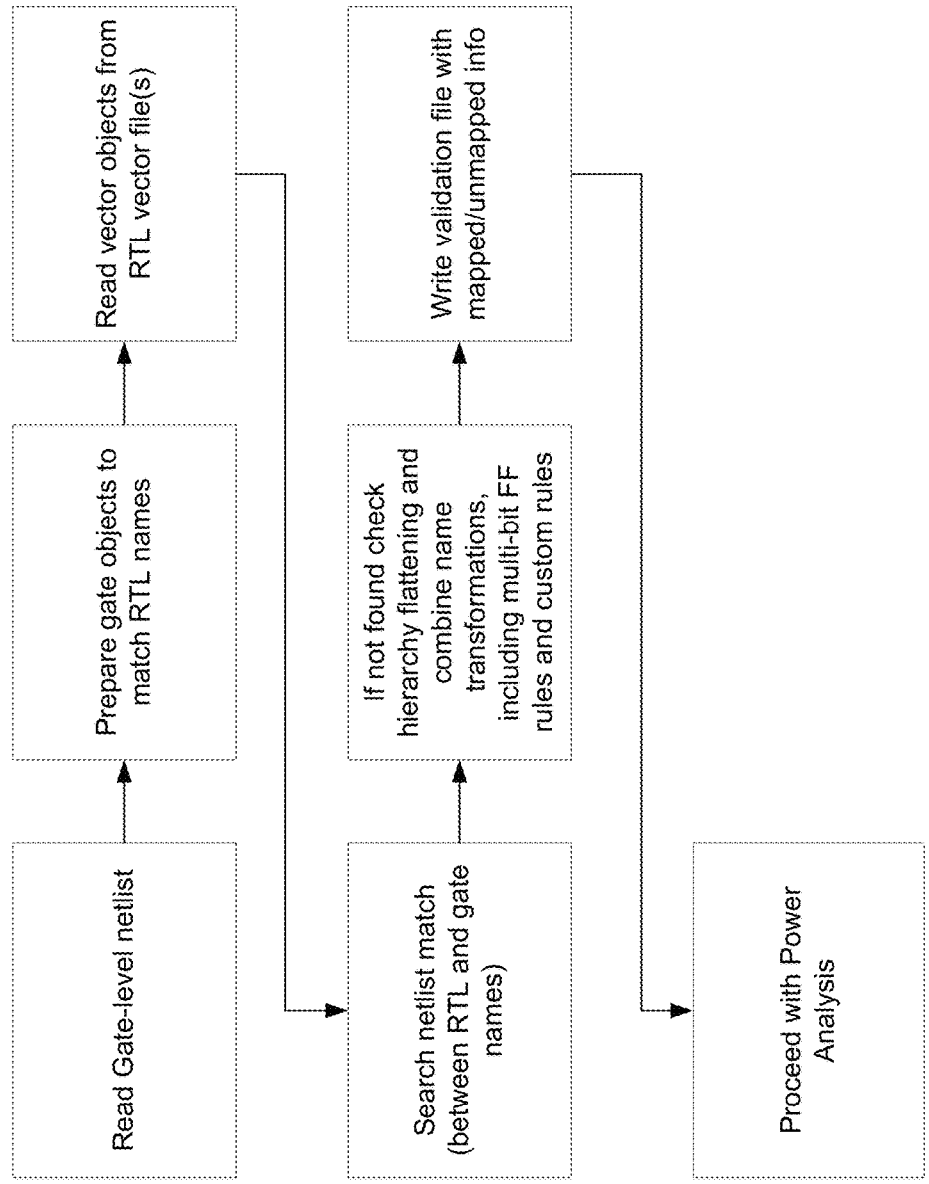
FIG. 4 is a schematic depicting aspects of the mapping process in accordance with an embodiment of the present disclosure.

Referring also to FIG. 4, a diagram 400 consistent with an embodiment of mapping process 10 is provided. Mapping process 10 may include an RTL auto-mapping feature, which may include a heuristic algorithm that may be configured to match RTL names inside an RTL netlist (i.e. inside RTL vectors) to gate level names inside post-synthesis netlist. No mapping file is needed for auto-mapping used in conjunction with mapping process 10 and not even an RTL netlist is not required.

In some embodiments, many name changes may occur, including hierarchical flattening, different array naming conventions, special naming when having RTL Verilog generation constructs, etc. With respect to multibit FF mapping, a mapping strategy may be essential to obtain appropriate coverage and meaningful power simulations. Examples of these are provided below:

Example 1 (Hierarchical Flattening)

(RTL): /DP/MDR_reg/qout[0]
(Gate): /DP/MDR_reg_qout_regx0x

Example 2 (Hierarchical Flattening)

(RTL): /fec_clk_div/o_divclk[105]
(Gate): /CDN_MBIT_fec_clk_div_o_divclk_reg_105_MB_fec_clk_div_o_divclk_reg_104/Q[0]

Example of different array naming conventions:

In some embodiments, objects with same name plus an incremental number may be described with different notation as
hier/array_name[0], hier/array_name[1], . . . , hier/array_name[n]
or
hier/array_name_0, hier/array_name_1, . . . , hier/array_name_n
or
hier/array_name_0_, hier/array_name_1_, hier/array_name_n_
or
hier/array_namex0x, hier/array_namex1x, . . . , hier/array_namexnx Example (RTL): fec_clk_div/o_divclk[105]
(Gate): fec_clk_div/o_divclk_reg_105
In some embodiments, multibit FF may be similar to standard sequential elements but with more than one bit. Basically they may represent a single object in a gate level netlist that map to more than one object in RTL netlist. This increases a lot complexity of the mapping and is one of the main benefit of our auto-mapping flow. Multiple objects can be distinguished by adding a suffix to the gate object name. An example of a 4-bit multibit FF is provided below:

(RTL): GPU/out[50]
(Gate): GPU/CDN_MBIT_out_reg_50_MB_out_reg_51_MB_out_reg_52_MB_out_reg_53/Q1
(RTL): GPU/out[51]
(Gate): GPU/CDN_MBIT_out_reg_50_MB_out_reg_51_MB_out_reg_52_MB_out_reg_53/Q2
(RTL): GPU/out[52]
(Gate): GPU/CDN_MBIT_out_reg_50_MB_out_reg_51_MB_out_reg_52_MB_out_reg_53/Q3
(RTL): GPU/out[53]
(Gate): GPU/CDN_MBIT_out_reg_50_MB_out_reg_51_MB_out_reg_52_MB_out_reg_53/Q4

In some embodiments, mapping process 10 may utilize an advanced mapping rule strategy that may be entirely automated. Additionally and/or alternatively, a complex custom mapping rule file may be used for particular situations to further improve the coverage. Different rules may be considered to cover multiple naming change rules.

In some embodiments, mapping process 10 may not significantly impact runtime. It may consider only RTL objects under the appropriate scope hierarchy.

In some embodiments, mapping process 10 may allow a user to check mapping coverage through a coverage summary and validation file. The validation file may allow for the discovery of various issues leading to unmapped objects. The validation file may include a text report that may be used to check for which objects the mapping was successful and for which others it was not. The validation file may include entries which matched the RTL Variables to Gate Level objects, entries in a netlist that could not be mapped to RTL variables, entries which are found in RTL but could not be mapped to a gate level netlist, etc.

As discussed herein, all power flows with RTL-vectors rely on a mapping file or on a very basic mapping rule file that is not able to deal with complex name transformations. In contrast, mapping process 10 may be configured to add an advanced mapping rule strategy for full RTL-vector coverage. This avoids any complicated or re-running of a lengthy Logical Equivalency Check step during synthesis in order to produce a full and clean mapping file. Mapping process 10 does not require any RTL netlist nor any kind of mapping file.

Some examples of custom rules are provided below. It should be noted that these rules are specific to some particular designs. They may be defined as simple patterns and may be included in the algorithm together with any default rules.

RTL→Gate
-----------------
zmk_reg_inst→snvs_1p_zmk_reg
genblk1→NULL
genblk11→NULL
rst_stst_gen→rst_status_i
lockup1_flop→NULL
  SCAN_CHAIN_BYPASS→lockup1_flop
Some examples of complex mapping are also provided below:

Example 1

(RTL): /GPU/GPU_TOP/b2d/block_b2d_pm/b2d/hi(0)/hi_axiwrbus/afifo/word0_no_checkReg/out[76]
(Gate): GPU/GPU_TOP/b2d/block_b2d_pm/b2d/hi_0_hi_axiwrbus/afifo/word0_no_checkReg/CDN_MBIT_ out_reg_76_MB_out_reg_77_MB_out_reg_78_MB_out_
reg_79_/Q0
(RTL): /GPU/GPU_TOP/b2d/block_b2d_pm/b2d/hi(0)/hi_
axiwrbus/afifo/word0_no_checkReg/out[77]
(Gate): GPU/GPU_TOP/b2d/block_b2d_pm/b2d/
hi_0_hi_axiwrbus/afifo/word0_no_checkReg/CDN_MBIT_
out_reg_76_MB_out_reg_77_MB_out_reg_78_MB_out_
reg_79_/Q1
(RTL): /GPU/GPU_TOP/b2d/block_b2d_pm/b2d/hi(0)/hi_
axiwrbus/afifo/word0_no_checkReg/out[78]
(Gate): GPU/GPU_TOP/b2d/block_b2d_pm/b2d/hi_0_hi_
axiwrbus/afifo/word0_no_checkReg/CDN_MBIT_out_
reg_76_MB_out_reg_77_MB_out_reg_78_MB_out_reg_
79_/Q2
(RTL): /GPU/GPU_TOP/b2d/block_b2d_pm/b2d/hi(0)/hi_
axiwrbus/afifo/word0_no_checkReg/out[79]
(Gate): GPU/GPU_TOP/b2d/block_b2d_pm/b2d/hi_0_hi_
axiwrbus/afifo/word0_no_checkReg/CDN_MBIT_out_
reg_76_MB_out_reg_77_MB_out_reg_78_MB_out_
reg_79_/Q3

Example 2

(RTL) aif_wb_sat_core_in0_inst/aif_wb_sat_core_re-
g_rt_inst/rd_reg_dgsep_dmx1_po_slc0_int_wdata[11]
(Gate) aif_wb_sat_core_in0_inst/aif_wb_sat_core_reg_rt_
inst/rd_reg_dgsep_dmx1_po_slc0_int_wdata_reg_11_rd_
reg_dgsep_dmx1_po_slc0_int_wdata_reg_15_/q0
(RTL) aif_wb_sat_core_in0_inst/aif_wb_sat_core_re-
g_rt_inst/rd_reg_dgsep_dmx1_po_slc0_int_wdat_[15]
(Gate) aif_wb_sat_core_in0_inst/aif_wb_sat_core_reg_rt_
inst/rd_reg_dgsep_dmx1_po_slc0_int_wdata_reg_11_
rd_reg_dgsep_dmx1_po_slc0_int_wdata_reg_15_/q1

Embodiments of mapping process 10 may include receiving, at one or more computing devices, an electronic design at an electronic design automation application and reading at least one gate-level netlist associated with the electronic design. Embodiments may also include preparing each gate object with different transformations so to match a register-transfer-level name and reading at least one vector object from one or more register-transfer-level vector files. Embodiments may further include attempting to identify at least one match in the gate-level netlist, wherein the at least one match is a match between a register-transfer-level name and a gate name. Embodiments may also include writing a validation file including at least one of mapped information and unmapped information. Embodiments may further include attempting to identify a match between the gate-level netlist and the RTL vector file. For example, each object in an RTL vector file may have a corresponding object in a gate netlist. These may be represented by a name in both domains. The names are usually very similar but can be very different. This situation may prevent the EDA application of prior approaches to match these objects unless names are exactly the same. Mapping process 10 may write a validation file separating mapped gate objects from not mapped ones.

In some embodiments, mapping process 10 may attempt to identify a match using any suitable approach. Some of these may include, but are not limited to, name transformations based on rules and/or equivalency checks of the register-transfer-level name to gate level name.

In some embodiments, if a match is not identified, mapping process 10 may include analyzing hierarchy flattening. This may include removing one or more hierarchical separators (/) from RTL names thus exploring all possible combinations.

It should be noted that embodiments of mapping process 10 does not involve the use of a mapping file. Such mapping files may include a 1 to 1 association between RTL names in RTL vector files and gate names in a gate netlist. It should also be noted that embodiments of mapping process 10 does not use an RTL netlist to supply a mapping file.

In some embodiments, EDA application 20 may support a variety of languages and/or standards. Some of these may include, but are not limited to, CDL, IEEE-standard languages, the Open Verification Methodology (OVM), the emerging Accellera Universal Verification Methodology (UVM), and the e Reuse Methodology (eRM). EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for mapping a register-transfer-level ("RTL") vector file to an electronic design comprising:
    receiving, at one or more computing devices, an electronic design at an electronic design automation application;
    reading at least one gate-level netlist associated with the electronic design wherein the at least one gate-level netlist includes one or more gate objects;
    preparing each gate object of the one or more gate objects of the at least one gate-level netlist with different transformations so to match a register-transfer-level name;
    reading at least one vector object from one or more register-transfer-level vector files, wherein the at least one vector object is a portion of the one or more register-transfer-level vector files;
    attempting to identify at least one match in the gate-level netlist, wherein the at least one match is a match between a register-transfer-level name of a vector object and a gate name of a gate object; and
    writing a validation file including at least one of mapped information and unmapped information, wherein the mapped information is based upon, at least in part, the at least one match and the unmapped information includes unmatched information.

2. The computer-implemented method of claim 1, further comprising:
    performing register-transfer-level power analysis.

3. The computer-implemented method of claim 1, wherein attempting to identify a match includes a name transformation.

4. The computer-implemented method of claim 1, further comprising:
    if a match is not identified, removing one or more hierarchical separators (/) from RTL names thus exploring all possible combinations.

5. The computer-implemented method of claim 1, further comprising:
    if a match is not identified, combining one or more name transformations.

6. The computer-implemented method of claim 5, wherein combining one or more name transformations includes applying one or more rules.

7. The computer-implemented method of claim 5, wherein combining one or more name transformations includes applying one or more custom rules.

8. A system for mapping a register-transfer-level ("RTL") vector file to an electronic design comprising:
    a computing device having at least one processor configured to receive an electronic design, the at least one processor further configured to read at least one gate-level netlist associated with the electronic design, wherein the at least one gate-level netlist includes one or more gate objects, the at least one processor further configured to prepare each gate object of the one or more gate objects of the at least one gate-level netlist with different transformations so to match a register-transfer-level name, the at least one processor further configured to read at least one vector object from one or more register-transfer-level vector files, wherein the at least one vector object is a portion of the one or more register-transfer-level vector files, wherein each vector object has a corresponding gate object in the gate-level netlist, the at least one processor further configured to attempt to identify at least one match in the gate-level netlist, wherein the at least one match is a match between a register-transfer-level name of a vector object and a gate name of a gate object, the at least one processor further configured to write a validation file.

9. The system for mapping in an RTL vector file onto an electronic design of claim 8, wherein attempting to identify a match includes a name transformation based upon, at least in part, one or more rules.

10. The system for mapping in an RTL vector file onto an electronic design of claim 9, wherein the name transformation includes a transformation between the register-transfer-level name and the gate-level name.

11. The system for mapping in an RTL vector file onto an electronic design of claim 8, further comprising:
if a match is not identified, removing one or more hierarchical separators (/) from RTL names and analyzing all possible combinations.

12. The system for mapping in an RTL vector file onto an electronic design of claim 8, further comprising:
if a match is not identified, combining one or more name transformations.

13. The system for mapping in an RTL vector file onto an electronic design of claim 8, wherein no processors access a mapping file.

14. The system for mapping in an RTL vector file onto an electronic design of claim 13, wherein no processors access an RTL netlist to access the mapping file.

15. A computer readable storage medium having stored thereon instructions, which when executed by a processor, result in one or more operations, the operations comprising:
receiving, at one or more computing devices, an electronic design at an electronic design automation application;
reading at least one gate-level netlist associated with the electronic design wherein the at least one gate-level netlist includes one or more gate objects;
preparing each gate object of the one or more gate objects of the at least one gate-level netlist with different transformations so to match a register-transfer-level name;
reading at least one vector object from one or more register-transfer-level vector files, wherein the at least one vector object is a portion of the one or more register-transfer-level vector files; and
attempting to identify at least one match in the gate-level netlist, wherein the at least one match is a match between a register-transfer-level name of a vector object and a gate name of a gate object.

16. The computer-readable storage medium of claim 15, further comprising:
performing register-transfer-level power analysis.

17. The computer-readable storage medium of claim 15, wherein attempting to identify a match includes a name transformation.

18. The computer-readable storage medium of claim 15, further comprising:
if a match is not identified, removing one or more hierarchical separators (/) from RTL names.

19. The computer-readable storage medium of claim 15, further comprising:
if a match is not identified, combining one or more name transformations.

20. The computer-readable storage medium of claim 19, further comprising:
applying one or more custom rules.

* * * * *